United States Patent [19]

Reicherts

[11] 4,356,675
[45] Nov. 2, 1982

[54] TIE-DOWN RUNNER FOR MOBILE HOME WALL CONSTRUCTION

[75] Inventor: James E. Reicherts, Cary, Ill.

[73] Assignee: United States Gypsum Company, Chicago, Ill.

[21] Appl. No.: 200,344

[22] Filed: Oct. 24, 1980

[51] Int. Cl.³ ............................................. E04B 5/00
[52] U.S. Cl. ...................................... 52/264; 52/293; 52/90
[58] Field of Search ................. 52/264, 293, 274, 732, 52/90, 290, 291, 295, 696, 330

[56] References Cited

U.S. PATENT DOCUMENTS

| | | | |
|---|---|---|---|
| 2,953,873 | 9/1960 | Tatro | 52/293 X |
| 2,966,708 | 1/1961 | Freeman | 52/293 |
| 3,196,998 | 7/1965 | Owen | 52/293 X |
| 3,255,563 | 6/1966 | Sauer | 52/732 |

FOREIGN PATENT DOCUMENTS

| | | | |
|---|---|---|---|
| 568002 | 10/1957 | Italy | 52/264 |
| 2062060 | 5/1981 | United Kingdom | 52/732 |

Primary Examiner—J. Karl Bell
Attorney, Agent, or Firm—Glenn W. Ohlson; Samuel Kurlandsky; Robert H. Robinson

[57] ABSTRACT

A tie-down runner to increase resistance to shear and racking forces in mobile home wall constructions is disclosed. Said tie-down runner having a generally J-shape and suitable for use at upper and lower ends of wall studding to increase resistance to said forces and to additionally provide increased attachment surfaces for interior wall panel members. A method for increasing resistance to shear and racking forces is also provided.

17 Claims, 3 Drawing Figures

TIE-DOWN RUNNER FOR MOBILE HOME WALL CONSTRUCTION

BACKGROUND OF THE INVENTION (1) Field of the Invention

The invention relates to mobile home wall construction utilizing a tie-down runner at upper and lower ends of wall studding for increased resistance to shear and racking forces.

(2) Description of the Prior Art

Present day construction techniques for mobile homes utilize wood plates for connection with studs at their upper and lower ends. Due to the large amount of vibration and flexing, which occurs during transportion of the mobile home unit from the manufacturing facility to final consumer use, the connections between the studs and plates loosen and the walls become particularly susceptible to racking forces. This has mandated the utilization of additional elements such as straps and braces for wall support. This problem is more apparent at exterior walls wherein the wood plates are supported above rim joists at the floor and underneath edge rails of roof trusses at the ceiling.

In order to increase the resistance of these walls to racking and shear forces, flexing, and vibration, improved support between studs and upper and lower supporting members is desirable. Additionally, the utilization of present wood plates does not provide sufficient area for affixation of interior-side panels, such as gypsum board. The amount of area to which the interior panels can be supported is limited to the stud surfaces and to the interior vertical surfaces of said wood plates. Typically, wood studs are utilized in mobile home construction. To continue using wood, rather than more costly steel studs, it would be desirable to improve upper and lower stud attachment techniques.

Rather than merely add additional bracing elements to existing wood plate types of constructions, it would be highly beneficial to totally eliminate the use of wood plates, and instead utilize steel tie-down runners which would satisfy and solve the problems now encountered.

It is, therefore, an important object of this invention to provide a steel tie-down runner for utilization at tops and bottoms of wood studs in mobile home wall constructions which greatly increase resistance to shear and racking forces, vibration, and flexing, which afflicts the present types of constructions.

SUMMARY OF THE INVENTION

A tie-down runner for use in wall constructions for mobile homes is provided. Said tie-down runner comprising an integral elongate configuration having, in cross-section, a generally J-shape, said runner capable of being positioned at the base of studs along flooring or at the top of studs at a ceiling. The runner having a shorter flange forming one arm of the J-shape, said shorter flange terminating in a base plate extending at generally right angle thereto, and said base plate terminating at an opposite edge in a longer flange forming the longer arm of the J-shape. Said longer flange including a return portion extending inwardly of the runner, the return being capable of engagement within notches of studs. The base plate including tab means extending in generally the opposite direction of the shorter flange in substantially the same plane as the shorter flange, wherein said tie-down runner comprises steel.

In a mobile home wall construction comprising wood studs and interior wall panels attached thereto, the improvement comprising, like tie-down runners each having a generally J-shape and positioned at upper and lower ends of studs in opposing alignment. Said tie-down runners having a shorter arm connected to a base plate at one edge thereof and a longer arm extending in parallel relationship from an opposite side edge of said base plate. The longer flange terminating in an inwardly extending return residing within notches in the studs. Wherein said tie-down runners provide increased resistance to shear and racking forces affecting said mobile home wall.

A method for improving resistance to shear and racking forces in a mobile home wall having wood stud members. Said method comprising the steps of: disposing flooring atop a floor construction having rim joists at exterior portions thereof; positioning a tie-down runner along said flooring at and along a rim joist, said tie-down runner having a generally J-shape with a shorter arm extending from one side edge of a base plate and a longer arm extending from an opposite side edge of the base plate, wherein said longer arm has a return flange suitable for insertion within a notch in a wood stud; affixing said tie-down runner to said flooring by mechanical fastening; disposing a lower end of a wood stud atop said base plate between said longer arm and shorter arm; cutting a notch in said stud to align with said return portion of said longer arm and positioning said return portion within said notch; disposing said wood stud in generally vertical alignment; positioning a substantially identical second tie-down runner in inverted relationship to the first tie-down runner at the upper end of the stud wherein said longer arms and shorter arms of the tie-down runners oppposingly face; disposing an edge portion of a ceiling surface along said second tie-down runner; placing an edge rail of a roof truss means above said second tie-down runner atop said ceiling surface; affixing said second tie-down runner to said ceiling surface by mechanical fastening; and, attaching wall panels to said stud by mechanical fastening means and to the longer arm of said tie-down runner by adhesive fastening.

DESCRIPTION OF THE PREFERRED EMBODIMENTS

With respect to the Figures the following description particularly points out the primary usefulness for this invention at exterior walls of mobile homes. It has become a concern of the mobile home construction industry to strengthen exterior walls to resist shear and racking forces, which are most severely experienced during transportation from the manufacturing site to the place of final resting. The racking and shear forces, combined with dynamic loading during transportation, cause interior wall panels to loosen and other connective devices to partially disengage in prior-art constructions. Therefore, the Figures illustrate the widely used construction having an all-wood construction. In satisfying the goals of the invention, the all-wood construction is greatly improved by the provisions of this invention.

Figure 1:
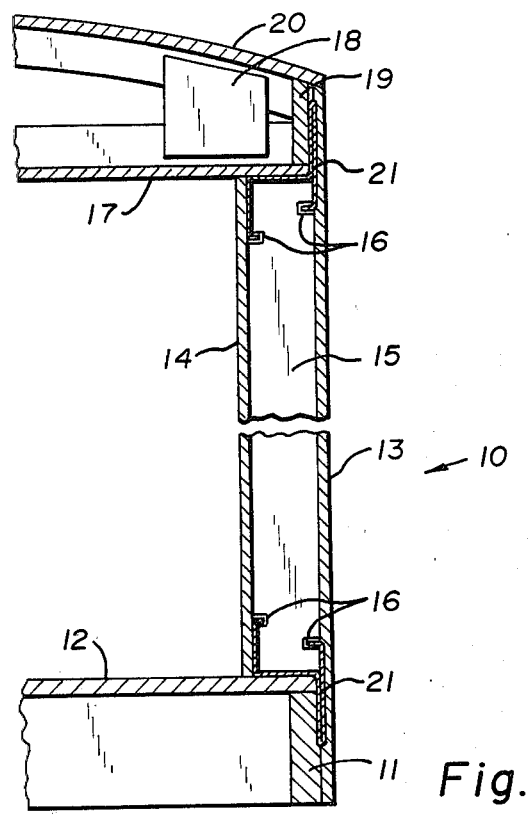
FIG. 1 is a cross-sectional view of an exterior mobile home wall incorporating the tie-down runner of this invention in its preferred embodiment.

With reference first taken to FIG. 1, a conventional design, being wall construction 10, is disclosed. Wall construction 10 includes rim joist 11 which extends along the exterior of a typical mobile home and supports, in part, flooring 12. At the outer surface, exterior wall surface 13 is provided and in its preferred embodiment comprises metal siding well known to the industry. At the interior, or room-side of a mobile home, a surface shown as comprising panels 14 is provided. Preferably, panels 14 comprise gypsum wall board having a thickness in the range of from about 5/16 inch to ⅝ inch (7.9 mm to 15.9 mm). Panels 14 are mechanically affixed to studs 15. Resting atop studs 15 is ceiling 17, which comprises the interior room-side surface. Ceiling 17 may include typical construction materials such as wood fiber, mineral fiber, gypsum, pressed-board, or other comparable materials. Roof truss 18 resides across ceiling 17 and includes edge rail 19 extending along the exterior of a mobile home generally parallel with rim joist 11, as shown. Atop roof truss 18 resides the exterior protective surface, being roof surface 20. Roof surface 20 is of a conventional metal-siding material, such as aluminum. In this conventional construction, the inventive tie-down runner 21 of this invention is positioned at the upper and lower ends of studs 15. Tiedown runner 21 is provided to improve present designs by replacing wood plate members which generally are 2 inch×3 inch (50.8 mm×76.2 mm) in cross-section but have also been provided in 1 inch×4 inch (25.4 mm×101.6 mm) and 2 inch×4 inch (50.8 mm×101.6 mm) sizes, depending on particular construction requirments. In replacing such wood plate members, increased resistance to racking, shear and dynamic forces is effectuated with the implementation of tie-down runner 21. A major problem found with present constructions is the small attachment surface afforded by the edges of these wood plates for interior wall panelling. In general, panels, such as panels 14, would be affixed at the shorter sides of wood plates by adhesive material and also attached to studs, such as studs 15, by staples, nails or screws. Tie-down runner 21 provides additional affixing surfaces, which imparts improved strength and rigidity to wall construction 10.

Figures 2, 3:
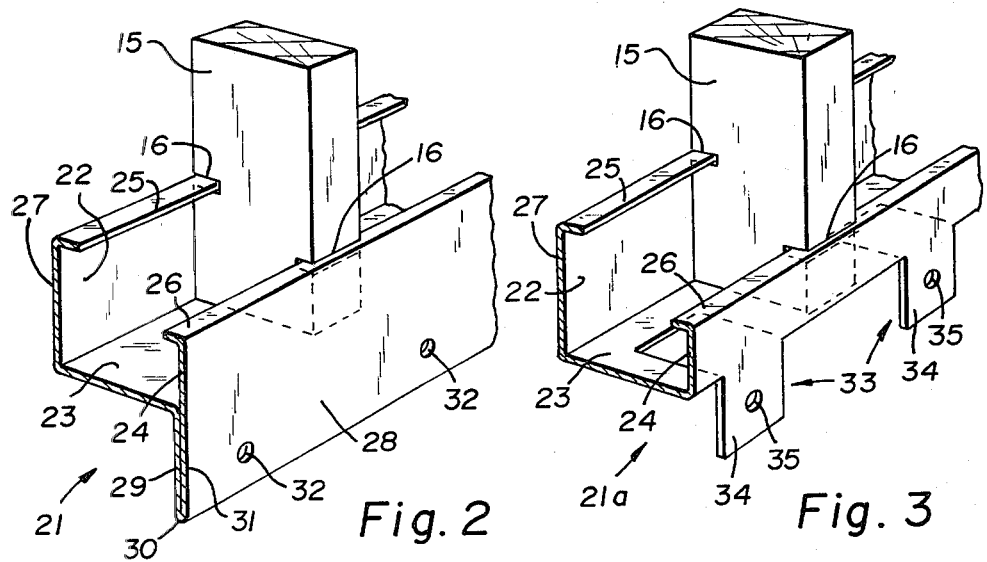
FIG. 2 shows the preferred embodiment for the tie-down runner of this invention.
FIG. 3 is an alternate preferred embodiment for the tie-down runner of this invention.

Turning now to FIG. 2, the preferred embodiment for tie-down runner 21 is depicted and is adaptable for placement in wall constructions 10 as shown in FIG. 1. Tie-down runner 21 comprises an integral construction of metal, preferably steel, having a range of thicknesses from about 20 gauge to about 26 gauge. Tie-down runner 21 comprises longer arm 22 extending from one side of base plate 23. At the side opposite longer arm 22, shorter arm 24 extends in substantially the same direction as longer arm 22 in generally parallel relationship thereto, for a distance less than longer arm 22 extends from base plate 23. In the preferred embodiment, both longer arm 22 and shorter arm 24 are provided with return portions 25 and 26 respectively. However, it is envisioned within the spirit of this invention that return portion 26 is optional but that return 25 is necessary for attainment of the goals set forth herein. In providing the aforesaid affixing area for panels 14, tie-down runner 21 includes interior panel affixing portion 27 which is the interior side surface of longer arm 22, as shown. Longer arm 22 is provided in a length greater than conventional wood plate thicknesses and thereby offers more surface area for panel attachment. With this additional surface, two beads of a conventional adhesive material can easily be applied for attachment of interior panels 14. In the preferred embodiment, longer arm 22 is about twice the length of shorter arm 24. Longer arm 22, for conventional construction using 2 inch×4 inch (50.8 mm×101.6 mm) studs, suitably has a length of 3 inches (76.2 mm) and shorter arm 24 has a length of 1½ inches (38.1 mm). In additionally improving wall construction 10, tie-down runner 21 includes integral tab means 28 extending in the opposite direction from shorter arm 24 generally co-planar therewith. Tab means 28, when provided as in FIG. 2, provides flashing means along a rim joist 11, and at an edge rail 19, which reduces air leakage and water seepage thereat. Since tie-down runner 21 is provided in a relatively thin gauge, it is envisioned that tab means include a first portion 29 which extends away from base plate 23 and at bend 30 bends back toward base plate 23 in a second portion 31. In this construction, shorter arm 24 is thus the integral extension of second portion 31 at, and above, base plate 23. Through tab means 28, holes 32 are provided permitting mechanical fasteners to pass therethrough to a rim joist or edge rail.

In utilizing tie-down runner 21, it is seen, when viewing FIGS. 1 and 2, that studs 15 are provided with notches 16 which are aligned to cooperatively engage return portions 25 and 26. Notches 16 may easily be cut during manufacturing at the desired aligning location. Tie-down runner 21 may be conventionally secured to flooring 12 and floor joist 11, and additionally to ceiling 16 and edge rail 19, by staple, nail or screw fastening means well known to the mobile home construction industry. In providing longer arm 22 and shorter arm 24 with integral base plate 23 therebetween, it is seen that tie-down runner 21 has a generally J-shape in cross-section with tab means 28 extending in an opposite direction from shorter arm 24.

With reference to FIG. 3, an alternate preferred embodiment for the tie-down runner of this invention is shown. The configuration for tie-down runner 21a is substantially the same as that for tie-down runner 21, with like numerals corresponding, however, tab means 33 differs from tab means 28 in that it is a non-flashing construction having flaps 34 struck-out, or knocked-out, from base plate 23 at regular spaced-apart intervals. Each flap 34 has a hole 35 therethrough facilitating fastening. When tab means 33 is provided, the manufacture of tie-down runner 21 will allow flaps 34 to remain co-planar with base plate 23 for ease of transportation and storage until such time that construction of a mobile home is undertaken. Additionally, tab means 33 may be allowed to remain co-planar with base plate 23 for use with not only exterior walls but transverse interior walls of a mobile home which extend generally at 90° to the longer exterior side walls. Thus tie-down runner 21a offers dual use.

The invention herein additionally encompasses a method for constructing a mobile home wall having improved resistance to shear and racking forces. With reference taken to FIG. 1, a preferred embodiment for the erection of wall construction 10 utilizing tie-down runner 21 will be hereinafter recited. This method is susceptible to alteration of the sequential steps depending upon particular construction needs. In the preferred form, the method comprises initially disposing flooring 12 atop a typical mobile home floor construction having rim joists 11 at exterior portions thereof. Next, the positioning of tie down runner 21 is undertaken along flooring 12 at and along rim joist 11. Thence, tie-down runner is affixed to flooring 12 by mechanical fastening techniques well known to the industry. A wood stud 15 is then disposed having its lower end atop base plate 23 between longer arm 22 and shorter arm 24. While stud 15 may be cut prior to the foregoing step, it may be, at this point, notched to form notch 16. If the preferred embodiment, as shown in FIG. 2, is used, shorter arm 24 will have optional return portion 26 and hence a second notch 16 would be cut for its insertion. The return portion 25, and optional return portion 26, are then positioned within a notch 16 which is cut in vertical alignment, or registration, for nested insertion of a return portion. Stud 15 is thence disposed in a generally vertical alignment. The method further includes positioning a substantially identical second tie-down runner 21 in inverted relationship to the first, or lower, tie-down runner at the upper end of stud 15 whereby the longer arms 22 and shorter arms 24 of the tie-down runners 21 opposingly face. Ceiling 17 is disposed having a peripheral edge portion along the second tie-down runner 21. In typical manufacturing procedures, roof truss means, such as roof truss 18, is erected in a separate step and then disposed atop the mobile home wall constructions. Therefore, the method disclosed herein includes the step of placing an edge rail 19 of roof truss 18 above said second tie-down runner 21 with the roof truss 18 atop ceiling 17. Second tie-down runner 21 is then affixed to ceiling 17, similar to the affixation of first tie-down runner to flooring 12 by conventional mechanical fastening. Wall panels 14 are then attached to stud 15 by mechanical fastening means, such as nails, screws, or staples, and wall panels 14 are also attached to longer arms 22 of tie-down runners 21 by adhesive fastening. The method, in an alternate preferred embodiment, can include the step of providing tie-down runners 21 having tab means 28 extending in opposite directions from shorter arms 24 in substantially the same plane therewith and disposing tab means 28 in contact with rim joist 11 at the lower end of the wall and in contact with edge rail 19 at the upper end of the wall. Essentially the same technique would be utilized for the implementation of tie-down runners 21a whereby tab means 33 would be similarly disposed. The utilization of tie-down runners 21a also includes the optional utilization of return 26 extending from shorter arm 24. Holes 32 of tab means 28 and holes 35 of tab means 33 provide means for the additional step of passing mechanical fasteners therethrough for affixation to rim joists 11 and edge rails 19 by the utilization of conventional fastening devices such as nails, screws or the like. At a transverse wall construction, which would run at generally 90° to the long dimension of a mobile home, the tie-down runner of this invention would be mechanically affixed through flooring 12 and ceiling 17 to structural members therebelow such as roof joists and floor joists of widely used floor and roof constructions for mobile homes. At such transverse interior walls, tab means 28 for tie-down runners 21 would not be provided and tab means 33 of tie-down runners 21a would not be bent 90° to base plate 23.

In determining the increased strength made possible by this invention, exemplary comparative tests were run to evaluate the increased shear and racking resistance of a mobile home wall construction utilizing the inventive tie-down runner of this invention versus conventional utilization of wood plates. In this example, walls were constructed which were 8 feet (2.44 m) wide and 8 feet (2.44 m) high with wood studs spaced 16 inches (406 mm) on center. The interior room-side was provided with 5/16 inch (7.9 mm) thick gypsum panels that were secured to the studs with staples and screws. The conventional walls were framed with 2 inch × 3 inch (50.8 mm × 76.2 mm) wood plates at the upper and lower ends of the studs. The walls constructed having the tie-down runners of this invention had longer arms being 3 inches (76.2 mm), shorter arms 1½ inches (38.1 mm), and return portions were ¼ inch (6.4 mm) long. In the conventionally erected walls the gypsum panels were affixed by adhesive applied along the interior 2 inch (50.8 mm) vertical side of the plate. The same conventional adhesive was applied to the tie-down runners along the interior sides of the longer arms. Testing was conducted in accordance with the procedures outlined in ASTM E-72. In this test a hydraulic ram provides racking forces to determine shear resistance of a wall. The results showed that the conventional wall had significantly inferior resistance to shear and racking forces. The average of the test results showed that the wall utilizing the tie-down runner of this invention provided 35% greater ultimate failure loading capability than the conventional design. The test procedures further demonstrate that conventional elements can be utilized with this invention, with only a simple additional step of notching studs. The same type of fasteners can be used, along with the same adhesives for interior wall panels, to obtain improved strength. The metal gauge thickness used for the tie-down runner in the test procedures was a preferable dimension of 24 gauge. The design used for testing was that as shown in FIG. 2 for tie-down runner 21. However, tab means 28 were not affixed to floor joists or edge rails which would increase even further the shear resistance of a wall.

It is fully expected within the spirit and scope of this invention that the tie-down runner may have additional embodiments equally suitable for utilization in addition to those shown for tie-down runners 21 and 21a. One such alternate construction would include shorter arm 24 comprising a rebent flange which would terminate at tab means therebelow. This alternate design would essentially be the inverse of tab means 28 shown in FIG. 2, whereby the bend would be at the end of shorter arm 24 rather than at bend 30 of first portion 21.

It is therefore seen that an improved wall construction for mobile homes has been provided by the utilization of the tie-down runner of this invention. Additionally, a method for constructing said improved wall construction is disclosed. While preferred embodiments for this invention have been shown, it is expected that the invention herein not be specifically limited thereto.

What is claimed is:

1. A steel tie-down runner for use in wall construction in mobile homes, said tie-down runner comprising an integral elongate configuration having a generally J-shape, said runner capable of being positioned at the base of studs along flooring and at the top of studs at ceilings, said runner having a shorter flange forming one arm of the J-shape, said shorter flange terminating in a base plate extending at generally right angles thereto, said base plate terminating at an opposite edge in a longer flange forming the longer arm of the J-shape, said longer flange including a return portion extending inwardly of the runner, said return being capable of engagement within notches of studs, said base plate including tab means extending in generally the opposite direction of the shorter flange in substantially the same plane as the shorter flange, and said tab means having holes therein to provide means for mechanically fastening said runner.

2. A tie-down runner as claimed in claim 1 wherein said longer flange is about twice the length of the shorter flange.

3. A tie-down runner as claimed in claim 1 wherein said tab means comprises a continuous flange extending for substantially the full length of said runner and thereby provides flashing means when utilized at exterior mobile home walls.

4. A tie-down runner as claimed in claim 3 wherein said tab means and shorter flange comprise a first portion integral with a side edge of said base plate extending at 90° thereto and thence comprising a rebent portion extending back towards the base flange for a length greater than said first portion but extending beyond said web plate less than said longer flange extends from said opposite edge, thereby providing said shorter flange.

5. A tie-down runner as claimed in claim 1 wherein said tab means comprises a series of individual spaced-apart flaps having a knocked-out configuration whereby said flaps are knocked-out from the base plate and bendable 90° thereto to form said tab means and each of said flaps has a hole therein.

6. A tie-down runner as claimed in claim 1 wherein said shorter flange terminates in an inwardly extending return portion being capable of engagement within notches of studs.

7. In a mobile home wall construction comprising wood studs and wall panels attached thereto, the improvement comprising, like tie-down runners each having a generally J-shape and positioned at upper and lower ends of studs in opposing alignment, said tie-down runners having a shorter arm connected to a base plate at one edge thereof and a longer arm extending in parallel relationship from an opposite side edge of said base plate, wherein the longer arm terminates in an inwardly extending return residing within notches of the studs, said base plate including tab means extending in generally the opposite direction of the shorter arm in substantially the same plane as the shorter arm and said tab means having holes therein to provide means for mechanically fastening said runner, and wherein said tie-down runners provide increased resistance to shear and racking forces affecting said mobile home wall.

8. An improved mobile home wall as claimed in claim 7 wherein said wall comprises an exterior wall having flooring extending below lower tie-down runners with a rim joist extending thereunder, the shorter arm positioned at the exterior side of said studs, and wherein said wall further includes a ceiling surface disposed above upper tie-down runners and a roof truss including an edge rail generally residing over said exterior wall, said shorter arm positioned at the exterior side of said studs, wherein said upper tie-down runners include tab means extending from said base plate generally co-planar with said shorter flange and extending in an opposite direction therefrom.

9. An improved mobile home wall as claimed in claim 8 wherein the tab means of said-tie down runners comprise a continuous flange extending integrally from said base plate for substantially the full length of said tie-down runners and thereby providing flashing means between said studs at the rim joists and edge rails.

10. An improved mobile home wall as claimed in claim 8 wherein said tab means includes a series of individual spaced-apart flaps having a knocked-out configuration whereby said flaps are knocked-out from said base plate and bendable 90° thereto to form said tab means and each of said flaps has a hole therein.

11. An improved mobile home wall as claimed in claim 7 wherein said tie-down runners have longer arms being about twice the length of said shorter flanges.

12. An improved mobile home ceiling wall as claimed in claim 7 wherein said longer flange of the J-shape provides a continuous affixation surface for attachment of said interior wall panels thereto.

13. An improved mobile home wall construction as claimed in claim 7 wherein said tie-down runners comprise steel having a thickness in a range of from about 20 gauge to about 26 gauge.

14. An improved mobile home wall as claimed in claim 7 wherein said shorter flanges of the tie-down runners terminate in inwardly extending return portions residing within notches of the studs.

15. A method for improving resistance to shear and racking forces in a mobile home wall having wood stud members, said method comprising the steps of disposing flooring atop a floor construction having rim joists at exterior portions thereof, positioning a tie-down runner along said flooring at and along a rim joist, said tie-down runner having a generally J-shape with a shorter arm extending from one side edge of a base plate and a longer arm extending from an opposite side edge of the base plate wherein said longer arm terminates in a return portion suitable for insertion within a notch in a wood stud, said base plate including tab means extending in generally the opposite direction of the shorter arm in substantially the same plane as the shorter arm and said tab means having holes therein, affixing said tie-down runner to said flooring by mechanical fastening through the holes in said tab means, disposing a lower end of a wood stud atop said base plate between said longer arm and shorter arm, cutting a notch in said stud to align with said return portion of said longer arm and positioning said return portion within said notch, disposing said wood stud in generally vertical alignment, positioning a substantially identical second tie-down runner in inverted relationship to the first tie-down runner at the upper end of the stud wherein said longer arms and shorter arms of the tie-down runners opposingly face, disposing an edge portion of a ceiling surface along said second tie-down runner, placing an edge rail on a roof truss means above said second tie-down runner atop said ceiling surface, affixing said second tie-down runner to said ceiling surface by mechanical fastening through the holes in said tab means, and attaching wall panels to said stud by mechanical fastening means and to the longer arms of said tie-down runner by adhesive fastening.

16. The method according to claim 15 wherein the steps of positioning the tie-down runners includes disposing the tab means of said lower tie-down runner in contact with said rim joist and the tab means of said upper tie-down runner in contact with said edge rail.

17. The method according to claim 15 wherein said step of positioning said tie-down runners includes the step of providing tie-down runners having shorter arms terminating in return portions, whereby the step of cutting a notch in said stud includes cutting a second notch at the side opposite the return portion of the longer arm to align with said return portion of said shorter arm and positioning said return portin within said second notch.

* * * * *